(No Model.)

O. ANDREWS.
PREPARING SALT FISH FOR MARKET.

No. 275,973. Patented Apr. 17, 1883.

WITNESSES
Joseph Ashbaugh
B. W. Williams

INVENTOR
Oscar Andrews
By his Atty.
Henry W. Williams

UNITED STATES PATENT OFFICE.

OSCAR ANDREWS, OF GLOUCESTER, MASSACHUSETTS, ASSIGNOR OF TWO-THIRDS TO JOSEPH H. ANDREWS, OF SAME PLACE, AND GEORGE TUCKER, OF ROCKPORT, MASSACHUSETTS.

PREPARING SALT FISH FOR MARKET.

SPECIFICATION forming part of Letters Patent No. 275,973, dated April 17, 1883.

Application filed March 5, 1883. (No specimens.)

*To all whom it may concern:*

Be it known that I, OSCAR ANDREWS, of Gloucester, in the county of Essex and State of Massachusetts, have invented a new and useful Improvement in Preparing Salt Fish for the Market, of which the following is a specification.

In this invention the salt fish is made into bars or cakes, each cake weighing, say, one or two or more pounds, and the layers of fish in each cake are held together and in compact form by means of fastening material passed through said layers, such fastening material being preferably, but not necessarily, thread or twine sewed through the layers, substantially as shown in the accompanying drawings, in which—

Figure 1:
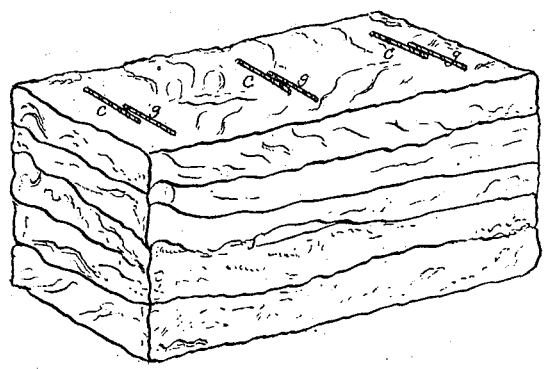
Figure 2:
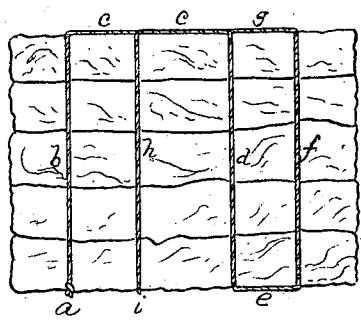

Figure 1 is a perspective view of a cake or bar of salt fish prepared according to my invention. Fig. 2 is a section of the same, taken at the point of fastening or sewing the layers together.

The salt fish is made by the manufacturer into substantially the shape shown in Fig. 1, weighing in this instance, say, two pounds, and supplied in this form to the retailer, who is saved the trouble and waste of cutting the fish for the consumer. Instead of holding the cakes or bars in position to prevent loosening of the layers by placing the bars into fitting boxes or wrapping them in paper or binding them externally with twine, I pass fastening material through the layers, thus effectually holding them together and preserving the integrity of the bar or cake. The preferable fastening material is twine or thread. Perhaps the best method of sewing the layers together is shown in Fig. 2, where a piece of twine provided with a knotted end, $a$, is passed up at $b$ through the layers, along the top of the cake at $c$, down through it at $d$, along the bottom at $e$, up through it again at $f$, along the top at $g$, and down again through the cake at $h$ to the bottom, where the other end, $i$, is cut off flush with the under side of the cake.

Having thus fully described my invention, what I claim, and desire to secure by Letters Patent, is—

1. The method of preparing salt fish for the market, consisting of first making the layers of fish into a bar or cake, and then applying a fastening material interiorly to the bar or cake by passing said fastening material through the layers of fish constituting said bar or cake, substantially as and for the purpose set forth.

2. As an improved article of manufacture, a bar or cake of salt fish, the layers of fish which constitute said bar or cake being held together compactly by means of fastening material passed through said layers, substantially as and for the purpose described.

OSCAR ANDREWS.

Witnesses:
WILLIAM WHARF,
IGNATIUS W. GUPPRY.